United States Patent

Ban

[15] 3,663,022

[45] May 16, 1972

[54] APPARATUS FOR SHIFTING MAGNETIC HEAD IN MULTI-TRACK TAPE PLAYER

[72] Inventor: Itsuki Ban, 829, Higashi-Oizumimachi, Nerima-ku, Tokyo-to, Japan

[22] Filed: June 22, 1970

[21] Appl. No.: 48,008

[30] Foreign Application Priority Data

June 23, 1969 Japan....................................44/58505
June 23, 1969 Japan....................................44/58506

[52] U.S. Cl. ..............................................................274/4 A
[51] Int. Cl. ..........................................................G11b 21/08
[58] Field of Search.................274/4 A, 11 A; 179/100.2 CA

[56] References Cited

UNITED STATES PATENTS 3,386,294 6/1968 Waldenburger........................274/4 A
3,437,762 4/1969 Lear et al...............................274/4 A
3,446,086 5/1969 Peltz et al. ............................274/4 A

*Primary Examiner*—Harry N. Haroian
*Attorney*—Jacobs and Jacobs

[57] ABSTRACT

An apparatus for shifting a magnetic head in multi-track magnetic tape player comprising cam means for positioning the magnetic head when rotated in a manner of corresponding to a plurality of discrete and separate recordtrack on the tape, a frictional wheel rotatable by selective abutment against a rotary capstan for driving the tape, a mechanism for controlling abutment of the frictional wheel with the capstan, a gearing for reducing rotation of the wheel to impart this rotation to the cam means, and a brake member adapted to abut against the wheel at the periphery thereof to brake rotation of the wheel at a point where the magnetic head is moved by one step by the cam means.

7 Claims, 4 Drawing Figures

APPARATUS FOR SHIFTING MAGNETIC HEAD IN MULTI-TRACK TAPE PLAYER

BACKGROUND OF THE INVENTION

This invention relates to a multi-track magnetic tape player, and more particularly to an apparatus for shifting a magnetic head for transducing the tape to play a plurality of record-tracks on the magnetic tape.

A conventional magnetic head shifting apparatus is generally composed of a cam for shifting the magnetic head to the position corresponding to record-tracks on the tape across the width of the tape, and a driving means for intermittently rotating the cam at a given angle. According to this arrangement, the driving means includes a ratchet wheel mounted coaxially with the cam, and an electromagnetic plunger for rotating the ratchet wheel through the pawl member and whenever the electromagnetic plunger is energized the cam is shifted in single step to position the magnetic head to successive record-track positions. In order to stably maintain a relative position of the magnetic head to the record-track on the tape, it is necessary to press a displaceable support member against the cam with strong elastic force. For this reason, a powerful driving force is required to rotate the cam. To this end the electromagnetic plunger to be used should be of massive and large dimensions and require much electricity. The use of the electromagnetic plunger of much electricity is not suitable for the magnetic tape player which is actuated by the battery. A space is also a problem when such a large-scaled electromagnetic plunger is mounted in the player. Further, the electromagnetic plunger of such class will cause a considerable impact sound when the player is performed and an overrun thereby resulting in a cross-talk.

As stated hereinbefore, various defects are derived from the use of the prior magnetic head shifting apparatus when such electromagnetic plunger.

In order to overcome the defects as those mentioned, the inventor has previously proposed various magnetic head shifting apparatus by which the cam is rotatably driven by the rotational force of the capstan for driving the tape. For instance, in copending application Ser. No. 12018, filed Feb. 17, 1970, there is described an apparatus which includes a frictional wheel rotatable upon abutment against a capstan to impart rotation of the wheel to the cam. With the arrangement in the copending application, a power transmission from the capstan is automatically released by one revolution of the wheel. However, this is likely to lead to the overrun.

In view thereof, the inventor has succeeded to obtain an improved magnetic head shifting apparatus by which rotation of the wheel is securely ended when the wheel is rotated through one revolution without causing any overrun.

SUMMARY OF THE INVENTION

It is a primary object of the invention to provide an improved apparatus for shifting a magnetic head in multi-track magnetic tape player, wherein the magnetic head is shifted to the position corresponding to record-tracks on the tape to be played by the use of rotational force of a capstan for driving the magnetic tape.

Another object of the invention is to provide an apparatus for shifting a magnetic head in multi-track magnetic tape player, which comprises a frictional wheel rotatable upon selective abutment against the capstan when the track to be played is changed-over, and a gearing for reducing rotation of the frictional wheel to impart the same to the cam means whereby when the wheel is rotated through one revolution the cam means is rotated to position the magnetic head to allow it to shift one step.

A further object of the invention is to provide an apparatus for shifting a magnetic head in multi-track magnetic tape player, wherein abutment force between the wheel and the capstan is automatically diminished in response to one revolution of the wheel, and at the same time a brake arm is pressed against the wheel to fully brake rotation of the wheel after the wheel is rotated through just one revolution whereby the overrun is prevented by the cam means and the magnetic head is precisely moved to the position corresponding to record track to be played.

These and other objects of the invention will be apparent from the following description and accompanying drawings in which:

DESCRIPTION OF THE PREFERRED EMBODIMENTS

Figure 1:
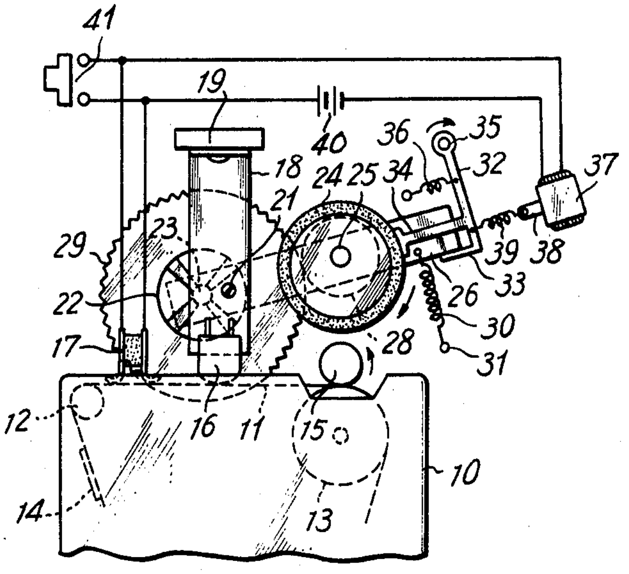
FIG. 1 is an explanatory view showing one embodiment of an apparatus for shifting a magnetic head in accordance with the present invention.

FIG. 1 illustrates a multi-track endless magnetic tape cartridge player with a portion having no connection with the present invention being broken away, in which one embodiment of an apparatus for shifting a magnetic head is provided. Numeral 10 designates an endless magnetic tape cartridge positioned in a predetermined operative position in the player. For the illustrative purposes, the cartridge 10 is shown schmatically to include a generally rectangular container having an endless magnetic tape 11 helically wound in conventional manner therein, and a tape guide post 12 and a pinch roller 13 mounted adjacent the leading edge of the cartridge. A deck (not shown) on the tape cartridge player carries a capstan 15 for cooperating with the pinch roller 13 to drive the tape 11, a magnetic head 16 adapted to transduce the tape 11, and an endmark detection or sensing means 17 having a pair of feeler contacts shorted by an endmark 14 of conductive foil on the tape in opposition to the leading edge of the cartridge 10 positioned in the playing position. The capstan 15 is rotatably driven at a preset constant speed in the direction of the arrow as shown by an electrical motor (not shown). The capstan 15 firmly presses the tape 11 against the pinch roller 13 in its drive relation. The driven tape 11 is transported across the endmark detector 17 and the magnetic head 16.

Figure 2:
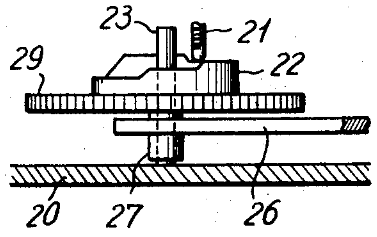
FIG. 2 is a front view showing a vicinity of the cam means illustrated in FIG. 1.

By an apparatus for shifting a magnetic head according to the present invention as will be fully described later, the magnetic head 16 may be positioned at a plurality of different predetermined fixed points across the width of the tape, thereby reproducing a plurality of discrete and separate record-tracks upon the tape at these points. The magnetic head 16 is firmly secured to a L-shaped displaceable support member made of leaf spring of which one end portion is fixed to a stable member 19 on a base plate 20 (FIG. 2). A threaded pin 21 is held in a threaded aperture (not shown) of the support member 18. The rounded bottom end of the threaded pin 21 is arranged to ride on a stepped face cam 22. The displaceable support member 18 inheres in downward elastic force to maintain the pin 21 and the cam 22 in operative relation. The face cam 22 is arranged to shift the magnetic head 16 into a plurality of discrete record-tracks on the tape 11. The face cam 22 comprises a plurality of flat steps different in each height along its peripheral face to oppose each of the record tracks on the tape. Ramps are provided between the flat steps of the cam 22. The lowest flat steps of the cam 22 position the magnetic head 16 at the lowest record-track on the tape 11. This is assured by the pin 21. The pin 21 rides up the adjacent ramps to the next flat step of the cam 22 when the cam is rotatably driven by one step by a driving means as will be fully described later. The face cam 22 is rotatably mounted to a shaft 23 standing on the base plate 20. A swing lever 26 is swingably provided by a sleeve 27 (FIG. 2) to the lower end of the shaft 23 and carries an axis 25.

The driving means comprises a rubber covered frictional wheel 24 journaled on the axis 25. The frictional wheel 24 is in a circular form and is eccentrically mounted to the axis 25. The wheel 24 as will be described later is caused to abut against the capstan 15 by movement of the swing lever 26 from the position as shown to the clockwise direction and is eccentrically and rotatably driven by the capstan 15. A gear 28 is supported with the wheel 24 on the axis 25. A gear 29 which meshes with the gear 28 is supported with the face cam 22 on the shaft 23. The gears 28 and 29 constitute a reducing gearing and rotation of the wheel 24 is reduced to be imparted to the face cam 22. In this instance, a gear ratio of the gear 28 and the gear 29 is 1:4 so that the face cam 22 may be rotated through 90° when the wheel 24 is rotated through a turn. The swing lever 26 is biased by the bias of a spring 30 interposed between a fixed pin 31 and the lever 26 to the direction that the wheel 24 abuts against the capstan 15. Swingable force of the swing lever 26 derived from the spring 30 is arrested by engagement of the free end of the lever 26 with a bent portion 33 of a stopper lever 32 pivoted to a pin 35 in the position where the wheel 24 is not rotatably driven by the capstan 15. The stopper lever 32 is biased by a spring 36 in the direction of the arrow as shown. The stopper lever 32 is provided with a brake arm 34 projecting therefrom at mid portion thereof. The tip end of the brake arm 34 is adapted to abut against the wheel 24 at its periphery thereof by the bias of the spring 36 when the stopper lever 32 is positioned to engage the swing lever 33, and thus free rotation of the wheel 24 is prevented. The stopper lever 32 is coupled by a spring 39 to a plunger 38 provided in a solenoid 37. The solenoid 37 is connected through a parallel connection of a pushbutton switch and the endmark detector 17 in series with a power source 40.

The operation of the magnetic head shifting apparatus of the invention will be apparent from the following description.

During the time that the cartridge 10 is played, when two feeler contacts of the endmark detector 17 is shorted by the endmark 14 on the tape 11 or the pushbutton switch 41 is manually operated and closed, the solenoid 37 is energized in pulse fashion by the power source 40 to attractively move the stopper lever 32 to the position where the lever 32 is disengaged from the swing lever 26. As a result, the spring 30 biases the swing lever 26 clockwise and the frictional wheel 24 is pressed against the capstan 15 under the bias of the spring 30. The stopper lever 32 is also moved by the solenoid 37 to keep the brake arm 34 away from the wheel 28 to thus admit of rotation of the wheel 28. The stopper lever 32 is clockwise returned to the original position by the bias of the spring 36 when the solenoid 37 is deenergized, however, the stopper lever 32 is not fully returned to the position as indicated by the drawing since the bent portion 33 is engaged by the end of the swing lever 26.

The wheel 24 pressed against the capstan 15 begins its rotation thereby in the direction of the arrow as shown. Rotation of the wheel 28 is imparted by the gears 28, 29 to the face cam 22. Since the wheel 24 is eccentrically pivoted to the axis 25, the swing lever 26 is reciprocally moved about the shaft 23 as the wheel 24 is rotated. After rotation of the wheel 24 through one revolution, the swing lever 26 is again arrested by the stopper lever 32 and abutment force between the wheel 28 and the capstan 15 imposed by the spring 30 is diminished to allow the end of the brake arm 34 to engage the wheel 24 at the periphery thereof to thus end rotation of the wheel 24, as shown in FIG. 1. For the illustrative purposes, the wheel 24 is exaggeratively shown as being away from the capstan 15, but it contacts the capstan 15 to the extent that the power is not imparted to the capstan 15. The wheel 24 is slipped to the capstan 15. As mentioned above, at every time the solenoid 37 is energized in pulse fashion, the wheel 24 is rotated through just a turn. Since the gear ratio of the gear 28 and the gear 29 is 1:4, one rotation of the face cam 22 allows the face cam 22 to rotate through 90°. For this reason, if the flat steps of the face cam 31 are spacedly provided by 90° in numbers of four, the magnetic head 16 is shifted by one step whenever the solenoid 37 is activated. More specifically, the magnetic head 16 may be positioned at four different predetermined fixed points across the width of the tape 11.

Where the tape 11 is provided with, as for example, two tracks, the face cam 22 is also provided with two flat steps by an angle of 180° and the gear ratio of the gear 28 and the gear 29 is 1:2, whenever the solenoid 37 is energized in pulse fashion, the wheel 24 is rotated through a turn and the face cam 22 is rotated through 180° to alternatively shift the magnetic head to the position where two record-tracks on the tape are played.

The wheel 24 having made one revolution is securely braked by the brake arm 34 to avoid overrun due to inertia thereby rotatably driving the face cam 22 at a given volume. In addition, the face cam 22 is relatively and powerfully rotated slowly by the rotational force of the capstan 15 so that movement of the magnetic head 15 is effected in a stable manner.

Figure 3:
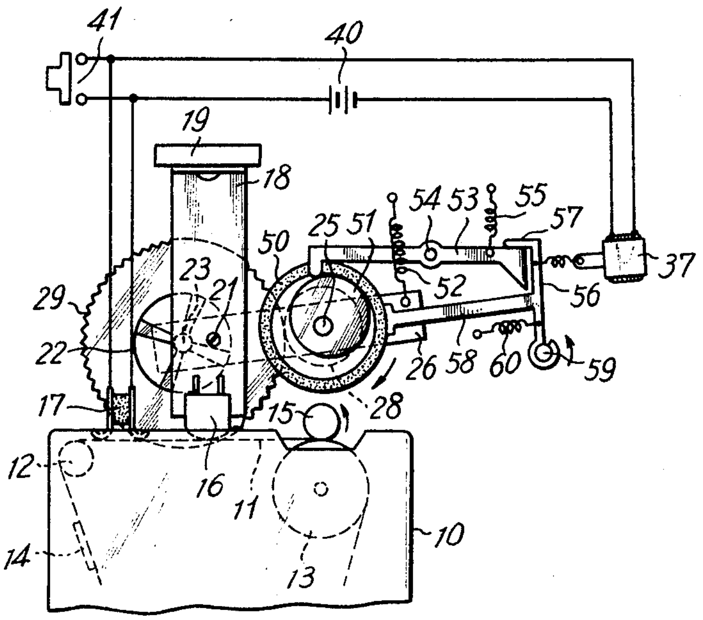
FIG. 3 is a schematic view of alternative embodiment of the apparatus for shifting the magnetic head in accordance with the invention.

FIG. 3 shows alternative embodiment of the apparatus according to the invention, wherein similar numerals are used to illustrate like parts in FIG. 1.

A frictional wheel 50 different from the wheel 24 (FIG. 1) is centrally journaled on the axis 25 and is provided with an eccentric cam 51 connected thereto. In the embodiment of FIG. 1, the swing lever 26 is clockwise biased by the spring 30 whereas the swing lever in the embodiment of FIG. 3 is counterclockwise biased by a spring 52 with a weaker elastic force. An actuating lever 53 has one end opposed to the eccentric cam 51 and is pivoted at its mid-portion to a pin 54. The actuating lever 53 is counterclockwise biased by a spring 55 to bias the swing lever 26 in the direction that the wheel 50 is pressed against the capstan 15. The spring 55 has the elastic force stronger than that of the spring 52. The eccentric cam 51 is always caused to contact the one end of the actuating lever 53 by means of the springs 52 and 53. Movement of the actuating lever 53 by the spring 55 is prevented by a stopper lever 56 pivoted to affixed pin 59 in the position where the wheel 50 is not substantially affected by the rotational force of the capstan 15. The stopper lever 56 is biased by a spring 60 in the direction of the arrow as shown to allow its bent portion 57 to engage the other end of the actuating lever 53. A brake arm 58 is projectively integrated with the stopper 56 to arrest free rotation of the wheel 50 when the stopper lever 56 is engaged by the actuating lever 53 to allow the end of the arm 58 to engage the wheel 50. The stopper lever 56 as similar to the stopper lever 32 (FIG. 2) is coupled to the solenoid 37 and is swung to be positioned to disengage the actuating lever 53 when the solenoid 37 is energized by the power source 40.

Now the solenoid 37 is energized and the stopper lever 56 is swung to be positioned to disengage the actuating lever 53, the actuating lever 53 is counterclockwise swung by the bias of the spring 55 while pressing the eccentric cam 51. With swingable movement of the actuating lever 53, the swing lever 26 is clockwise urged through the eccentric cam 51 to allow the wheel 50 to abut against the capstan 15. At this point, the brake arm 58 is spaced away from the wheel 50 so that the wheel 50 is caused to be rotatably driven in the direction of the arrow as shown by the capstan 15. The eccentric cam 51 is rotated with the wheel 50 and the actuating lever 53 is reciprocally swung by the cam 51 when made through one revolution. When the eccentric cam 51 is rotated through one revolution, the actuating lever 53 is again engaged by the stopper 56 and prevented from swinging thereby. Engagement of the actuating lever 53 with the stopper lever 56 diminishes abutment force between the wheel 50 and the capstan 15 imposed by the spring 55 on the other hand the brake arm 58 contacts the wheel 50 whereby rotation of the wheel 50 is arrested at a point where the wheel is made through one revolution. It will be understood that during one revolution of the wheel 50, the face cam 22 is rotated through the gears 28 and 29 to move the magnetic head 16 by one step.

Figure 4:
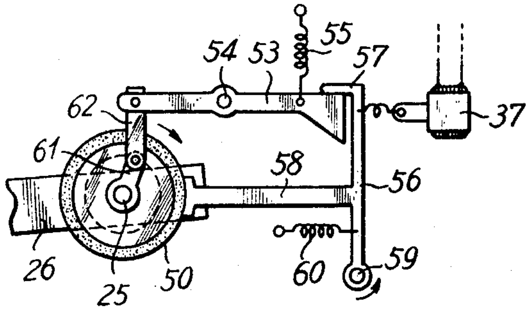
FIG. 4 is a representation schematically showing another embodiment of the apparatus for shifting the magnetic head of the invention.

FIG. 4 shows an alternative form of the embodiment as shown in FIG. 3, wherein similar numerals are used to illustrate like parts in FIG. 3. In the embodiment of FIG. 4, a crank 61 in place of the eccentric cam 51 (FIG. 3) may be coupled to the wheel 50. The crank 61 is connected by a lever 62 to the actuating lever 53. When the actuating lever 53 is disengaged from the stopper lever 56 and is thus counterclockwise swung by the bias of the spring 55, and the swing lever 26 is in turn swung by the lever 62 and the crank 61 to allow the wheel 50 to abut against the capstan and to be rotated thereby. When the wheel 50 is rotated through one revolution, the actuating lever 53 is reciprocally swung by the crank 61, the lever 62 and is again engaged by the stopper lever 56. With engagement of the actuating lever 53 with the stopper lever 56, abutment force between the wheel 50 and the capstan 15 imposed by the bias of the spring 55 is diminished at the same time the brake arm 58 is pressed against the wheel 50 to hold rotation of the wheel 50. It will be understood that the magnetic head is moved by one step by one revolution of the wheel 50.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. An apparatus for shifting a magnetic head in multi-track magnetic tape player, including at least one magnetic head adapted to transduce the tape, a tape drive device for driving the tape, which comprises:

a rotary drive capstan of said tape drive device for driving the tape;

a displaceable support member coupled to said magnetic head for positioning it with respect to a plurality of discrete and separate record-tracks on the tape;

cam means coactable with the support member for controlling displacement of the magnetic head to play the record-tracks, said cam means having a plurality of successive cam regions spaced apart in accordance with the record-tracks, said cam regions being constructed to displace the support member to corresponding positions when in individual coaction therewith and thereby position the magnetic head for play with associated record-tracks;

driving means for rotating the cam means in single steps to position the magnetic head to successive record-track positions, and wherein said driving means comprises a shaft rotatably supporting the cam means, a swing lever swingably provided to the shaft, a frictional wheel rotatably mounted on the swing lever, and a gearing for imparting rotation of the frictional wheel to the cam means with reduction ratio by which the cam means is rotated by a single step as the frictional wheel is rotated through one revolution, said frictional wheel being adapted to selectively abut against the capstan and to be rotated thereby in relation to swingable movement of the swing lever;

bias means for biasing the swing lever in the direction that the wheel abuts against the capstan and for providing abutment force for the wheel and the capstan;

stopper means for controlling the bias of the bias means to diminish abutment force between the wheel and the capstan, the stopper means comprising a movable stopper lever, a brake arm integrally formed with the stopper lever to contact the periphery of the wheel to arrest rotation of the wheel when the stopper means is actuated, a solenoid for moving said stopper lever from the original position to disengage actuation of said stopper means, and a control circuit for controlling current supply to said solenoid, the wheel being pressed against the capstan by the bias of the bias means while the brake arm being away from the wheel and rotatably driven by the capstan in response to movement of the stopper lever from the original position by the solenoid, the stopper lever being returned to the original position in response to one revolution of the wheel to thus diminish abutment force between the wheel and the capstan at the same time the brake arm is pressed against the wheel to arrest rotation of the wheel.

2. An apparatus in accordance with claim 1, wherein said frictional wheel is an eccentric wheel and said swing lever is reciprocally swung by one revolution of the eccentric wheel.

3. An apparatus in accordance with claim 2, wherein said bias means is a spring for biasing said swing lever in the direction that said wheel abuts against the capstan, said stopper lever has a bent portion engageable with the free end of the swing lever when in said original position, the bent portion being disengaged from the free end of the swing lever when the stopper lever is moved from the original position by said solenoid, the end of the bent portion is restricted by a portion of the swing lever until said wheel is rotated through one revolution to make one reciprocation of the swing lever, the stopper lever being prevented from returning to the original position.

4. An apparatus in accordance with claim 1, wherein said driving means comprises an eccentric cam connected to said frictional wheel and rotatable therewith, a swingable actuating lever one end of which is engaged with the eccentric cam at the periphery thereof, and a spring for imposing swingable force through the actuating lever and the eccentric cam to said swing lever in the direction that the frictional wheel abuts against the capstan.

5. An apparatus in accordance with claim 4, wherein said stopper lever includes a bent portion engageable with the other end of said actuating lever when in said original position, the stopper lever being moved from the original position by said solenoid to allow the bent portion to disengage the actuating lever to rotate said wheel upon abutment with said capstan, the actuating lever being reciprocally swung by said eccentric cam rotatable with said wheel, the end of the bent portion being restricted by a portion of the actuating lever and being prevented from returning to the original position until the wheel is rotated through one revolution.

6. An apparatus in accordance with claim 1, wherein said driving means comprises a crank connected to said frictional wheel and rotatable therewith, a swingable actuating lever one end of which is engaged with said stopper lever, a connecting lever for connecting the other end of the actuating lever with the crank, and a spring for imposing swingable force through the connecting lever and the crank to said swing lever in the direction that the frictional wheel abuts against the capstan.

7. An apparatus in accordance with claim 6, wherein said stopper lever has a bent portion engageable with the one end of said actuating lever when in said original position, the stopper lever being moved from the original position by said solenoid to allow the bent portion to disengage the actuating lever to rotate said wheel upon abutment with said capstan, the actuating lever being reciprocally swung by said crank rotatable with said wheel and connecting lever, the end of the bent portion being restricted by a portion of the actuating lever and being prevented from returning to the original position until the wheel is rotated through one revolution.

* * * * *